Dec. 5, 1950 P. SPENCE 2,532,958
REGULATING VALVE
Filed June 26, 1943
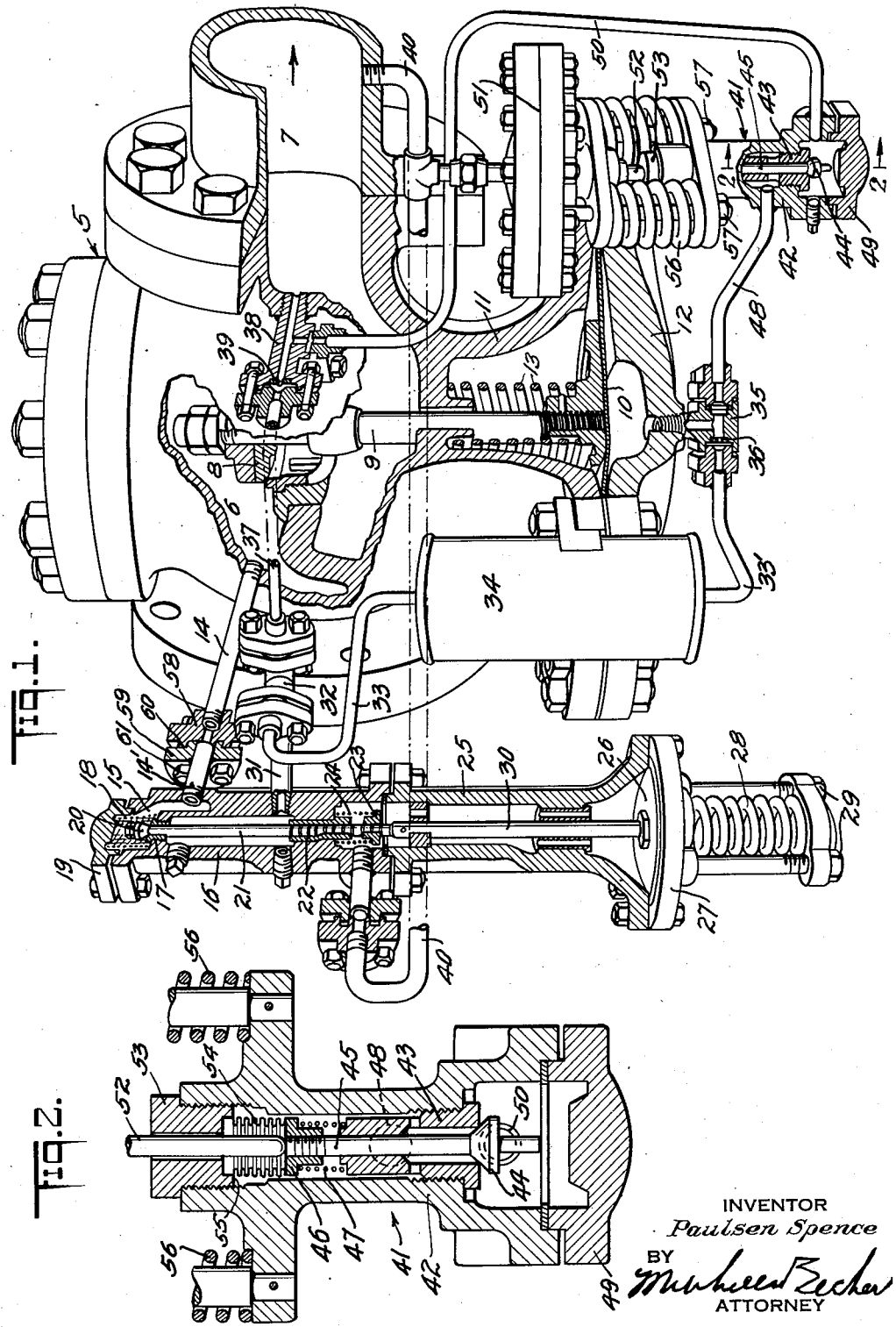
INVENTOR
*Paulsen Spence*
BY
*Michael Becker*
ATTORNEY Patented Dec. 5, 1950

2,532,958

UNITED STATES PATENT OFFICE 2,532,958

REGULATING VALVE

Paulsen Spence, Hot Springs, Ark., assignor to Spence Engineering Company, Inc., Walden, N. Y., a corporation of New York Application June 26, 1943, Serial No. 492,385

4 Claims. (Cl. 50—10)

My invention relates to a regulating valve and may be said to be in part at least in the nature of an improvement on valves of the type shown in my Patent No. 1,995,949, issued March 26, 1935.

It is the general object of the invention to provide an improved form of regulating valve.

It is a more specific object of the invention to provide a diaphragm actuated regulating valve with improved means for protecting the diaphragm against rupture.

It is another object to provide means for constantly supplying condensate to a fluid pressure actuated means so as to prevent direct access of steam thereto.

It is another object to provide improved connection means between various parts of the regulating valve.

Other objects will be hereinafter pointed out or will become apparent to those skilled in the art.

In the drawings which show, for illustrative purposes only, a preferred form of the invention—

Fig. 1 is an isometric view in partial section of a regulating valve, illustrative of the invention;

Fig. 2 is an enlarged, fragmentary, detail sectional view, taken substantially in the plane of the line 2—2 of Fig. 1.

The main valve illustrated is quite similar to the valve shown in my patent above referred to and will therefore be but briefly described herein.

One of the principal features of the present invention is the provision of means for preventing too great a differential of pressure between opposite sides of the diaphragm, whether that differential be caused by an excessive pressure on the high pressure side of the diaphragm, or on the low pressure side thereof.

Before describing my invention more in detail, it may be here stated that in the type of valve shown in my prior patent, and particularly Fig. 3 thereof, if the main valve should become stuck in open position; for example, if a piece of scale should hold the main valve in open position, the pressure on the outlet or reduced pressure side of the main valve would rise and the pressure on the low pressure side of the main diaphragm which actuates the valve would consequently rise. On the other hand, pressure on what is normally the high pressure side of the main diaphragm would drop, due to the opening of the safety pilot valve shown in Fig. 3 of my patent, and the differential in pressure between opposite sides of the main diaphragm might be sufficient to rupture the main diaphragm. I have provided safety means for preventing the attainment of an excessive differential.

Another dangerous condition might arise where there is a large reduction of pressure, say, from 450 pounds down to 65 pounds, for example: When the main valve is wide open the amount of fluid passing through the valve might be insufficient to keep up the normal low pressure at the low pressure side of the valve. Such a condition might arise if, say, the low pressure pipe should break. With the main valve wide open, but yet unable to supply a sufficient quantity of fluid to maintain the desired pressure at the low pressure side of the main valve, the pilot valve in performing its normal function would permit an excessive build-up of pressure on the high pressure side of the main diaphragm, and such high pressure on the high pressure side, coupled with the reduced pressure on the low pressure side thereof, might cause rupture. I have provided improved means to take care of this latter condition. I have also provided means tending to assure a supply of condensate instead of steam in contact with both the main diaphragm and pilot diaphragm.

The main regulating valve 5 herein disclosed, which as stated is quite similar to the valve disclosed in my prior patent, includes a high pressure side 6 and a low pressure side 7. The valve casing is provided with the usual partition and valve seat and the passage of fluid through the valve is controlled by the main valve member 8 cooperating with the seat. The valve stem 9 cooperates with and may be secured to the main diaphragm 10, which may be secured in the usual manner in a diaphragm chamber formed by the hood 11 and bonnet 12. Passage means, such as a loose fit between the valve stem and the upper partition in the bonnet, as indicated at 12, permits pressure communication between the low pressure side 7 of the main valve and the upper or low pressure side of the main diaphragm. A coil spring 13 serves to urge the valve member 8 in closing direction.

The main diaphragm 10 is urged upwardly or in valve opening direction by pressure fluid preferably derived from the high pressure side 6 of the main regulating valve. In the form shown, a pressure connection 14 from the high pressure side 6 of the main regulating valve leads to the inlet side 15 of the pilot valve which controls the supply of fluid to the high pressure side of the main diaphragm 10. The pilot valve as a whole includes preferably an elongated casing 16 having a valve seat 17 near its upper end. A strainer 18 may be provided for preventing the entry of scale or other solid matter from the main valve into the pilot valve. The upper end of the casing may be closed by a flanged fitting 19 as illustrated. The pilot valve member 20 seats downwardly on its seat and the valve stem 21 extends downwardly through a guide sleeve 22 and may terminate at point 23. A collar and spring 24 may be employed for urging the pilot valve 20 in closing direction. The casing 16, in the form shown, is connected as by means of a flanged fitting to the upper end of a relatively elongated diaphragm hood 25, and a pilot diaphragm 26 may be clamped in the usual manner between the lower end of the hood 25 and a bonnet or ring 27. Means such as a spring 28, adjustable as by means of nuts 29, urges the diaphragm 26 upwardly in accordance with the spring adjustment. A push rod 30 cooperates with and may be connected to the diaphragm 26 and is guided in the hood 25 and positioned beneath the lower end of the pilot valve stem 21. Thus, when the diaphragm and push rod 30 move upwardly, the pilot valve 20 is lifted from its seat and when the push rod moves downwardly, the pilot valve is moved toward its seat as by means of the spring 24.

High pressure fluid entering the pilot valve inlet chamber 15 through the connection 14 passes the pilot valve when the latter is open and then enters the pipe connection 31, which may terminate in a Y-connection 32. One branch of the Y is connected through suitable fittings to a pipe 33, which may include a condensate reservoir 34 of relatively large capacity. A continuation 33′ of the pipe 33 is connected to a T-fitting 35 secured to the bonnet 12 and opening at the high pressure or lower side of the diaphragm 10. At some point between the pilot valve and the high pressure side of the diaphragm 10, there is a restriction and in the form shown the T-fitting 35 includes an orifice plate 36 providing a restricted flow of pressure fluid (in this case preferably condensate) to and from the high pressure side of the diaphragm 10. The other branch of the Y 32 is connected as by means of a pipe connection 37 to a fitting 38 screwed into or otherwise fastened to and communicating with the low pressure side 7 of the main regulating valve. This pressure connection likewise includes a restriction and in the form shown the fitting 38 is provided with an orifice plate 39 to bleed pressure fluid from the high pressure side of the main diaphragm or directly from the pilot valve, depending upon the volume of fluid being supplied by the pilot.

The main pilot valve is controlled in this case in accordance with a pressure condition and specifically in accordance with the pressure in the high pressure side 7 of the regulating valve. The control pipe 40, connected to the low pressure side of the main valve, is connected to the pilot valve casing which is itself connected to the upper end of the pilot diaphragm hood 25. Thus, when the pressure is below normal in the outlet side of the main regulating valve, the pressure on pilot diaphragm 26 will be below normal and the pilot valve 20 will be opened so as to permit the entry of pressure fluid to the Y connection and consequently to the lower side of the main diaphragm 10. The pressure beneath the diaphragm 10 opens the main valve 8 and it remains open until the outlet pressure rises to the desired degree. At that point, the pressure in control pipe 40 urges the pilot diaphragm 26 downwardly so as to close or partially close the pilot valve 20 and thereafter pressure may bleed from beneath the main diaphragm 10 back through the Y fitting to the low pressure side of the main valve. The pilot valve ordinarily will quickly reach a position of equilibrium so as to permit the passage of just sufficient pressure fluid to maintain the main valve member 8 in such position as to maintain the outlet pressure where desired. Except for certain features of novelty and improvement, the valve, pilot, and operation as thus far described are similar to those of my prior patent.

In addition to the parts heretofore described, I employ what may be termed a safety pilot valve 41. This safety pilot valve functions to a certain extent like the safety pilot 70 shown in Fig. 3 of my prior patent. The safety pilot includes a valve body 42 having a valve seat member 43 and a safety pilot valve member 44 cooperating therewith, as will be understood. The valve member 44 in the preferred form acts not only as a safety pilot in the sense that it is a pilot, but acts also as a differential pop valve. In the form illustrated, the valve stem 45 is guided in the seat member 43 and may be provided with a collar 46 (Fig. 2) at the upper end serving as an upper abutment for a coil spring 47 interposed between the abutment and the seat member 43, as will be clear. The spring 47 is adjusted as by means of the collar 46 so as to hold the valve 44 closed until there is a sufficient differential of pressure between the upper and lower sides of the valve to cause it to open. The high pressure side of the main diaphragm 10 is connected through the T-fitting 35 and pipe 48 with the space above pop valve 44. The space below the pop valve is closed as by means of a flange fitting 49. In order to provide a proper differential between the upper and lower sides of the pop valve 44 and thus prevent a complete venting of pressure fluid from the high pressure side of the diaphragm 10, with consequent probability of rupture of the diaphragm, I connect the outlet side of the pop valve 44 as by means of a pipe 50 with the low pressure side of the main valve. As illustrated, the pipe 50 is connected by a flange fitting to the fitting 38 so as to provide a free communication between the low pressure side of the main valve and the outlet side of the pop valve 44.

Now, should there be a considerable reduction of pressure from the high pressure side 6 to the low pressure side 7 of the main valve, for example if the reduction were, say, from 450 down to 65 pounds, a condition might arise (for example, if the outlet pipe from the main valve should burst) such that the main valve 8 would be wide open and even though wide open would be unable to supply a sufficient volume of steam to maintain the 65 pounds pressure in the outlet side 7 of the main valve. Under such conditions, the pilot valve 20 in performing its normal function would be wide open and 450 pound pressure fluid would be supplied to the high pressure side of the main diaphragm 10 while the opposite side of the diaphragm 10 would be subjected merely to the abnormally low pressure in the low pressure side 7 of the main valve. Under such conditions, the diaphragm 10 normally might be ruptured but with the pop valve spring 47 set to permit the pop valve 44 to open, say, at a 100 pound differential, the pop valve would open upon the attainment of such a differential and the difference in pressure between the high pressure side and the low pressure side of the diaphragm 10 would never exceed 100 pounds, the 100 pounds being assumed to be a non-injurious pressure differential.

The differential pop valve 44 is arranged to serve not only as a pop valve but also as a safety pilot valve. In the form shown, the control pipe 40 in the low pressure side 7 of the main valve is connected to a point above the diaphragm in a diaphragm chamber designated generally 51. The diaphragm has attached thereto or cooperating therewith a push rod 52 (Fig. 2) which is positioned above the upper end of the pop valve stem 45. The push rod may extend down loosely through a bushing 53 in the valve body 42 and the lower end may be housed in a closed metal bellows 54, which may be welded or otherwise secured to the bushing 53 as indicated at 55. The closed end of the bellows may rest upon but is not secured to the collar 46 on the pop valve stem. The diaphragm in the diaphragm chamber 51, and with it the push rod 52, may be urged upwardly as by means of springs 56, the force of which may be adjusted as by means of nuts 57.

The safety pilot arrangement just described is designed to take care of the other condition mentioned heretofore, namely, a condition of excessive pressure in the low pressure side 7 of the main valve, which excessive pressure might be occasioned, for example, by having the main valve 8 stuck in open position. Under such circumstances, the pressure in the control pipe 40 being high would cause the main pilot valve 20 to be closed so no pressure would be transmitted to the high pressure side of the diaphragm 10 from the high pressure side of the main valve. At the same time, pressure in the control pipe 40 would depress the safety pilot diaphragm so as to open the safety pilot valve 44. Now, if this safety pilot acted in the manner of the safety pilot disclosed in my prior patent, fluid would be freely vented to the atmosphere from the high pressure side of the diaphragm 10 and the high pressure acting above the diaphragm 10, which is normally the low pressure side, might cause the diaphragm 10 to be ruptured. However, with the pipe 50 connecting the outlet side of the safety pilot valve 44 with the low pressure side 7 of the main valve, the pressure fluid beneath the diaphragm 10 cannot be vented to a pressure below the pressure in the low pressure side 7 of the main valve and therefore the pressures on opposite sides of the diaphragm 10 will be about balanced and there is no danger of rupturing the diaphragm.

Where high pressures are involved, it is desirable to employ flanged tongue and groove fittings and to employ welded joints wherever possible. Thus, the fittings herein shown are all of the flanged tongue and groove type, preferably with welded connections; for example, as shown in Fig. 1, in the pressure connection 14 I employ one fitting flange 58 which may be screwed to and also welded to the pipe 14, and the pipe 14 may in turn be screwed into and welded to the body of the main valve. Similarly, the pipe 14' may carry the companion fitting flange 59 and be welded thereto and the pipe 14 may be welded to the pilot valve body. The fitting flanges may be provided with interfitting annular tongue members 60 and packings may be employed where desired. The flanges may be held together as by means of bolts and nuts designated generally 61. All of the fittings on the high pressure connections are preferably made as indicated.

While the invention has been described in considerable detail and a preferred form illustrated, it is to be understood that various changes may be made and certain features herein disclosed may be employed independently of others, all within the scope of the invention as defined in the appended claims.

I claim:

1. A regulating valve having a high pressure side and a low pressure side, a main valve member for controlling the passage of fluid through said regulating valve, a main valve diaphragm cooperating with said main valve for actuating the latter, a pressure connection from the low pressure side of said main valve to the low pressure side of said diaphragm for always subjecting the low pressure side of said diaphragm to the pressure at the low pressure side of said main valve, a pilot valve for admitting pressure fluid to the high pressure side of said diaphragm for actuating said main valve member in one direction, means for controlling said pilot valve for normally controlling the pressure at the high pressure side of said diaphragm, a safety pilot valve communicating at one side with said high pressure side of said main valve diaphragm and the other side with the low pressure side of said main valve whereby when said safety pilot valve is open the pressure on said high pressure side of said diaphragm will be substantially the same as the pressure at the low pressure side of said main valve, and means acting independently of said pilot valve and its actuating means and subject to the pressure at the low pressure side of said main valve for operating said safety pilot upon the attainment of a predetermined pressure at the low pressure side of said main valve, whereby upon attainment of a desired higher-than-normal regulated pressure at the low-pressure side of said main valve, said safety pilot may function to close said main valve member and thus to govern the regulation of said main valve.

2. In a regulating-valve means, a main valve having a high-pressure side and a low-pressure side, a main-valve member for controlling the passage of fluid through said regulating-valve means, a main-valve diaphragm cooperating with said main-valve member for actuating the latter, a pressure connection from the low-pressure side of said main valve to the low-pressure side of said diaphragm for always subjecting the low-pressure side of said diaphragm to the pressure at the low-pressure side of said main valve, a pilot valve for admitting pressure fluid to the high-pressure side of said diaphragm for actuating said main-valve member in one direction, control means for said pilot valve for normally controlling the pressure at the high-pressure side of said diaphragm, and safety-valve means acting independently of said pilot valve and of its actuating means to provide both a safety high limit of pressure in the main-valve outlet and a high pressure-drop limit across said diaphragm, said safety-valve means including pressure-operated means connected to the low-pressure side of said main valve, and a vent connection controlled by said pressure-operated means and connecting the high-pressure side of said diaphragm to the low pressure side of said main valve, whereby upon failure of said pilot valve to regulate a given low pressure on the low-pressure side of said main valve said pressure-operated safety-valve means may vent pressure fluid from said diaphragm in order to move said main valve in a closing direction, said safety-valve means further including pressure-differential operated means connected to respond to a given difference in pressure between that at the high-pressure side of said diaphragm and that at the low-pressure side of said main valve, said differential-pressure operated means being connected to vent the high-pressure side of said diaphragm to the low-pressure side of said main valve upon attainment of said given difference in pressure, whereby upon attainment of a given pressure difference across said diaphragm said pressure-differential operated means may operate to vent high-pressure fluid to the low-pressure side of said main valve and thus to prevent establishment of an excessive pressure differential across said diaphragm.

3. Regulating-valve means according to claim 2, in which said safety-valve means includes a single valve member in said vent connection, and in which both said pressure-operated means and said pressure-differential operated means are connected to open said single valve member, said pressure-differential operated means being connected to open said single valve member, independently of said pressure-operated means.

4. Regulating-valve means according to claim 2, in which the pressure-fluid connection which includes said pilot valve is more restrictive to flow than is said vent connection, whereby more effective and more rapid venting of said diaphragm may be promoted.

PAULSEN SPENCE.

REFERENCES CITED

The following references are of record in the file of this patent:

UNITED STATES PATENTS

| Number | Name | Date |
|---|---|---|
| 361,796 | Watts | Apr. 26, 1887 |
| 986,165 | Graham | Mar. 7, 1911 |
| 1,228,104 | Fulton | May 29, 1917 |
| 1,906,652 | Spence | May 2, 1933 |
| 1,995,949 | Spence | Mar. 26, 1935 |
| 2,171,613 | Vance | Sept. 5, 1939 |
| 2,189,750 | Barge | Feb. 13, 1940 |
| 2,193,720 | Griswold | Mar. 12, 1940 |
| 2,353,143 | Bryant | July 11, 1944 |
| 2,370,110 | Spence | Feb. 20, 1945 |

FOREIGN PATENTS

| Number | Country | Date |
|---|---|---|
| 12,193 | Great Britain | July 6, 1900 |
| 691,657 | Germany | June 3, 1940 |